US006412267B2

(12) United States Patent
Duse

(10) Patent No.: US 6,412,267 B2
(45) Date of Patent: Jul. 2, 2002

(54) METHOD OF MANUFACTURING AN OPENABLE LINK OF A TRACK

(75) Inventor: Enzo Duse, Bologna (IT)

(73) Assignee: D, Alpe Sas Consulenze Industriali Dell, Ing. Enzo Duse & C., Bologna (IT)

( * ) Notice: Subject to any disclaimer, the term of this patent is extended or adjusted under 35 U.S.C. 154(b) by 0 days.

(21) Appl. No.: 09/825,581

(22) Filed: Apr. 2, 2001

Related U.S. Application Data

(63) Continuation-in-part of application No. 09/021,928, filed on Feb. 11, 1998, now abandoned.

(51) Int. Cl.[7] .............................. B23H 9/00; B26D 55/20
(52) U.S. Cl. ....................... 59/35.1; 219/69.12; 305/186
(58) Field of Search .................................. 305/186, 200, 305/201, 202, 204; 219/69.12, 69.17; 59/35.1, 23, 30

(56) References Cited

U.S. PATENT DOCUMENTS

| | | | | |
|---|---|---|---|---|
| 3,636,296 A | * | 1/1972 | Semin | 219/69.12 |
| 3,731,043 A | * | 5/1973 | Ullmann et al. | 219/69.12 |
| 4,105,260 A | * | 8/1978 | Blunier et al. | 305/54 |
| 4,233,486 A | * | 11/1980 | Inoue | 219/69.12 |
| 4,239,952 A | * | 12/1980 | Rhyner | 219/69.12 |
| 4,351,573 A | * | 9/1982 | Bedis et al. | 305/54 |
| 4,420,671 A | * | 12/1983 | Bonga | 219/69.12 |
| 4,457,565 A | * | 7/1984 | Bissi et al. | 305/58 |
| 4,547,646 A | * | 10/1985 | Briffod | 219/69.12 |
| 4,579,394 A | * | 4/1986 | Bedis et al. | 305/54 |
| 4,636,014 A | * | 1/1987 | Dennison et al. | 305/54 |
| 4,762,974 A | * | 8/1988 | Kern | 219/69.12 |
| 5,700,384 A | * | 12/1997 | Marchand et al. | 219/69.12 |

* cited by examiner

Primary Examiner—David Jones
(74) Attorney, Agent, or Firm—Sofer & Haroun, LLP

(57) ABSTRACT

A method of manufacturing a first connecting link and a second connecting link from an individual forging which can be juxtaposed along a predetermined profile to form an openable link for joining a chain of links into a closed loop to form a track comprises the steps of providing the individual forging of the openable link, securing the forging in a cantilevered position on a work table, and cutting the forging along the predetermined profile from one side to the other side of the forging by spark-erosion machining with a wire so that the first connecting link and the second connecting link are provided with juxtaposed, sided by side cut surfaces, where the first connecting link is formed and separated from the second connecting link leaving the second connecting link secured on the work table in a pre-determined position.

15 Claims, 6 Drawing Sheets

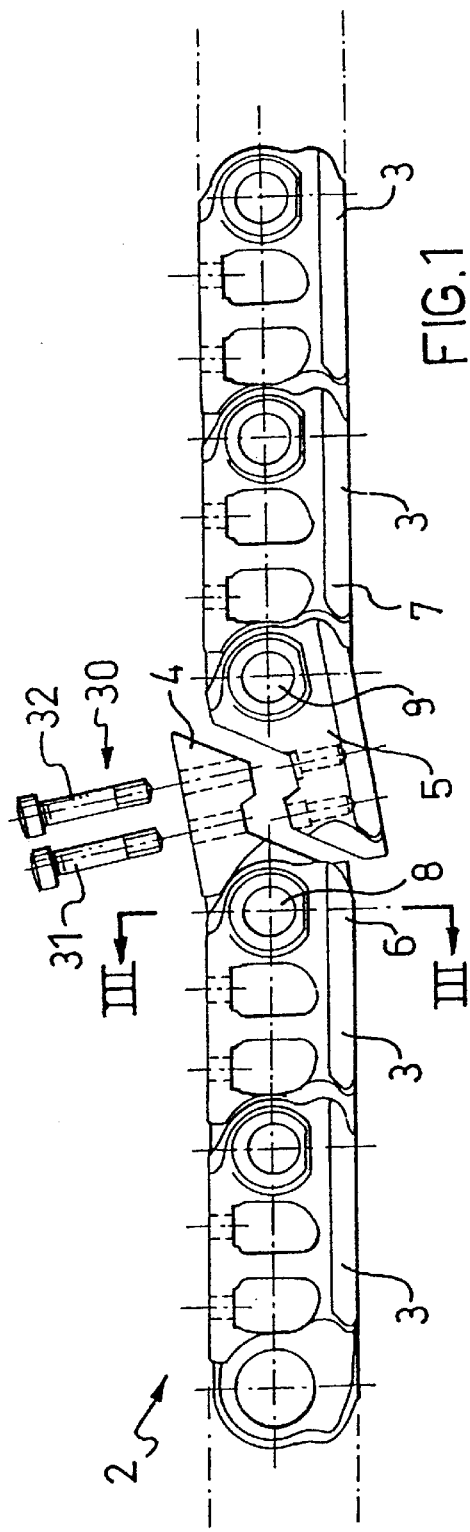
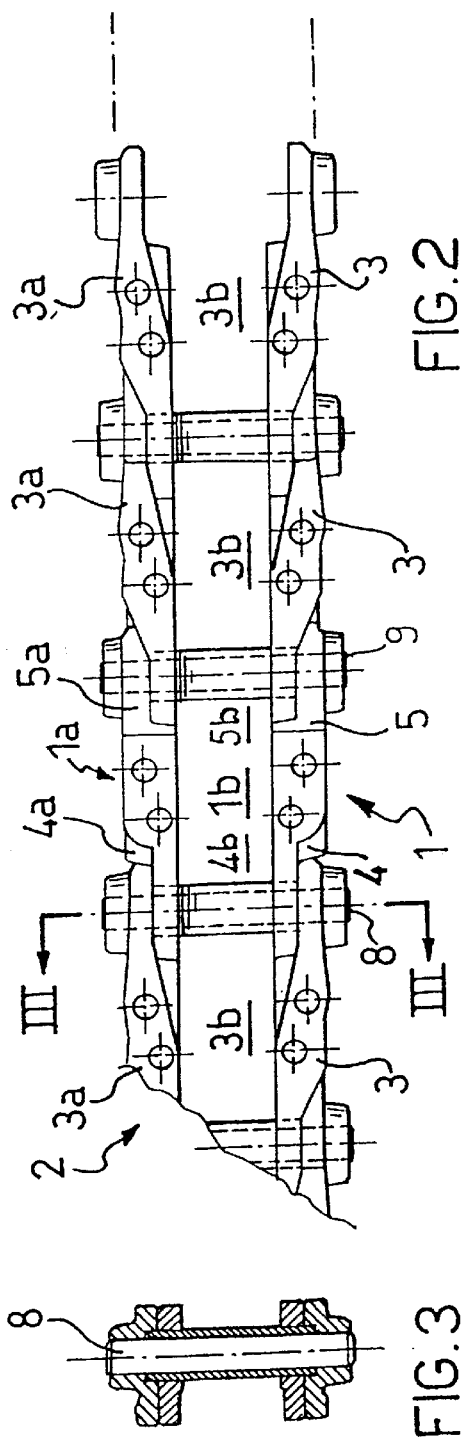

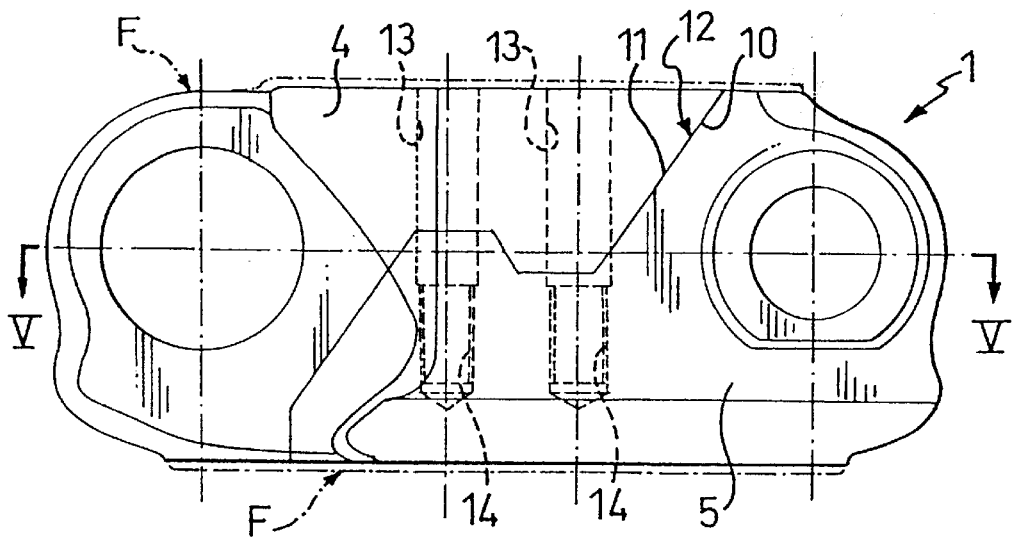
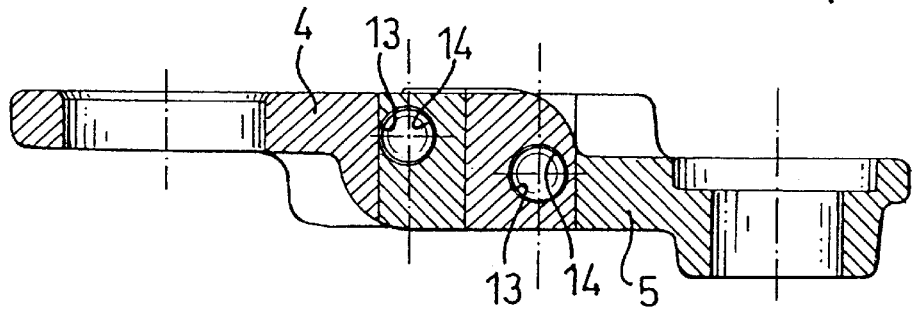
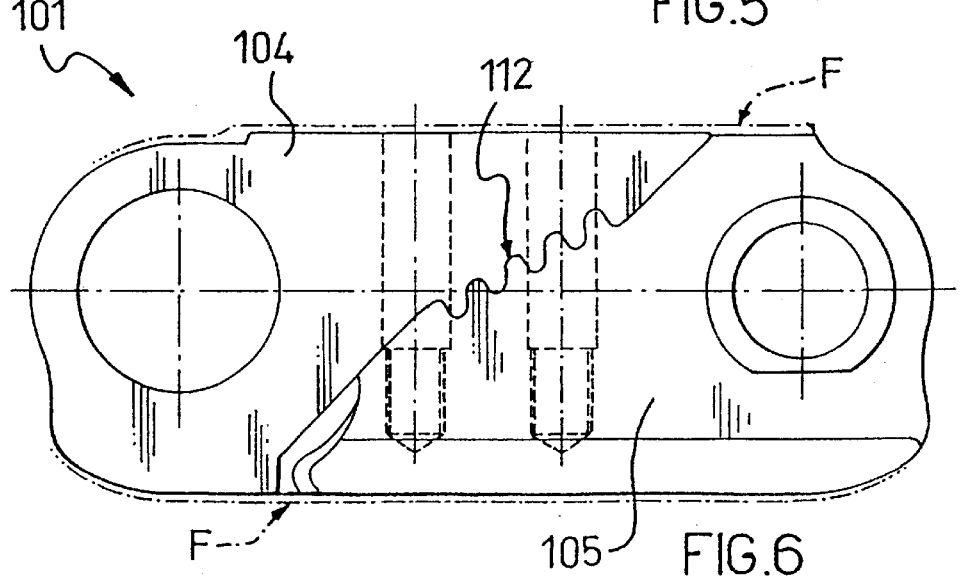

METHOD OF MANUFACTURING AN OPENABLE LINK OF A TRACK

RELATED APPLICATIONS

This application is a Continuation-In-Part of application Ser. No. 09/021,928 filed on Feb. 11, 1998, now abandoned.

DESCRIPTION

Field of the Invention

The present invention relates to a method of manufacturing connecting links which can be juxtaposed along a predetermined profile to form an openable link for joining a chain of links into a closed loop to form a track for tractors and the like.

BACKGROUND OF THE INVENTION

As is known, tracks for tractors and the like are produced by closing a chain of links articulated to one another or, more precisely, hinged to one another by means of pins, into a loop.

Chains have for some time been joined to form closed loops according to a known technique by the insertion and removal of a pin between the two links at the ends of the open chain. However, this method is very laborious with manual assembly and disassembly and, moreover, is not very reliable because the pin has to be driven into the links by force. Moreover, this method cannot be used for lubricated chain links owing to the presence of a predetermined quantity of lubricant fluid in the pin and owing to the presence of lubrication ducts.

At the moment, the chain of links is therefore joined into a closed loop by means of an openable link formed by two connecting links which are juxtaposed and joined together by suitable connection means. Although this method is satisfactory from various points of view and is widely used, it leave something to be desired form the manufacturing point of view. In fact the manufacture of a tract of this type and, in particular, the manufacture of the openable link, requires the provision of specific and expensive tooling, operating in accordance with a complex working cycle.

The problem upon which the present invention is based is that of providing a method of manufacture of the type specified which overcomes the problems mentioned with reference to the prior art.

SUMMARY OF THE INVENTION

This problem is solved by a method of manufacture of the type specified which is characterized in that it comprises the steps of providing a forging of the openable link and cutting the forging along the said profile by spark-erosion machining with a wire.

BRIEF DESCRIPTION OF THE DRAWINGS

Further characterized and the advantages of the method of manufacture according to the present invention will become clear from the following description of an embodiment thereof, given with reference to an openble link as shown by way of non-limiting example in the appended drawings, in which:

FIG. 1 is an elevational view of a detail of a track incorporating an openable link manufactured by a method according to the invention, in the open position;

FIG. 2 is a plan view of the detail of FIG. 1;

FIG. 3 shows the detail of FIG. 2 in a cross-section taken on the line III—III;

FIG. 4 is an elevational view of the openable link of FIG. 1 in another operating condition and on an enlarged scale;

FIG. 5 is a shows the openable link sectioned on the line V—V of FIG. 2;

FIG. 6 is an elevational view showing, on an enlarge scale, another embodiment of an openable link manufactured by the method according to the invention;

DETAILED DESCRIPTION OF THE INVENTION

Figure 7:
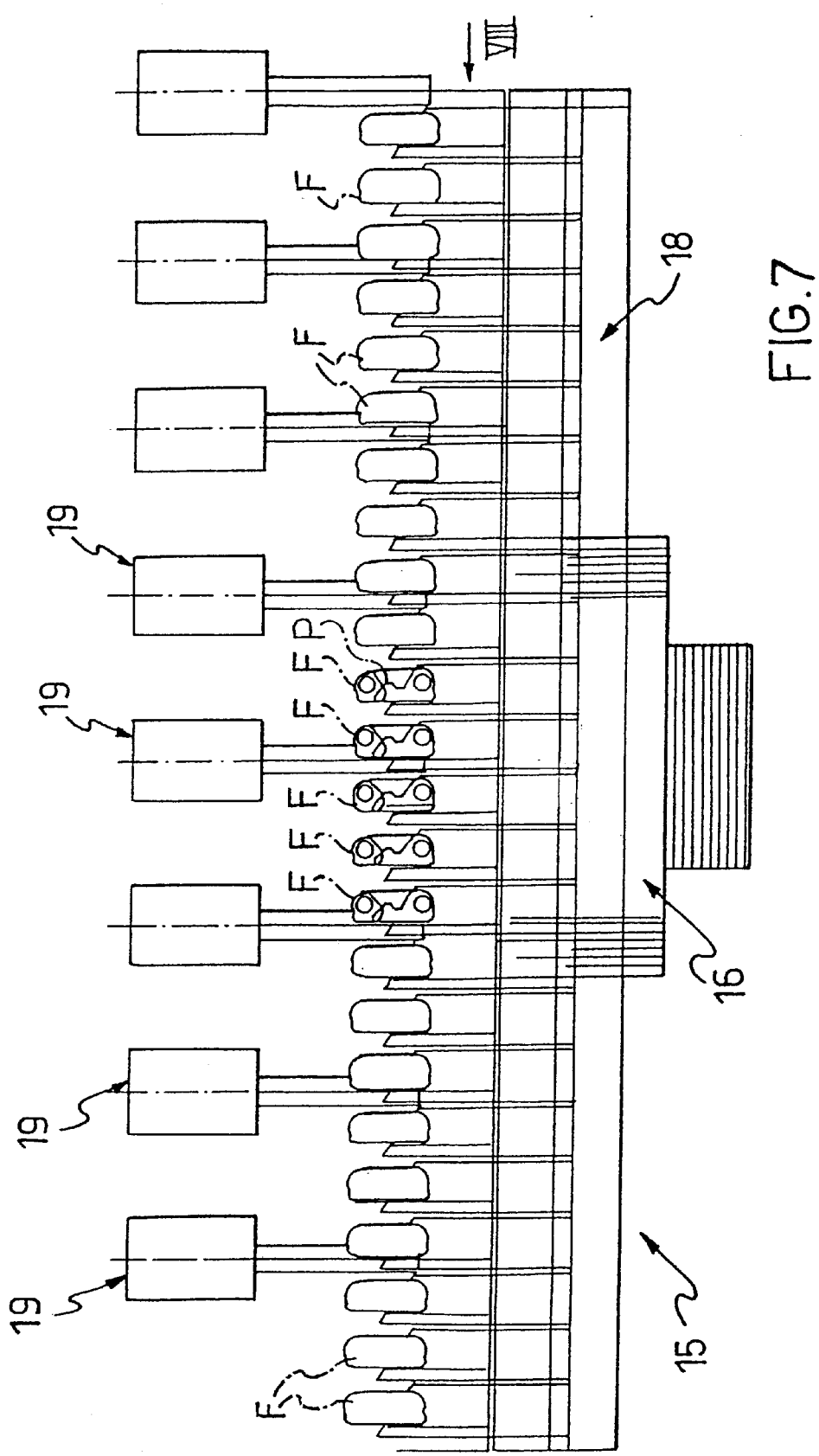
FIG. 7 is a plan view of apparatus for implementing the method according to the invention.
Figure 8:
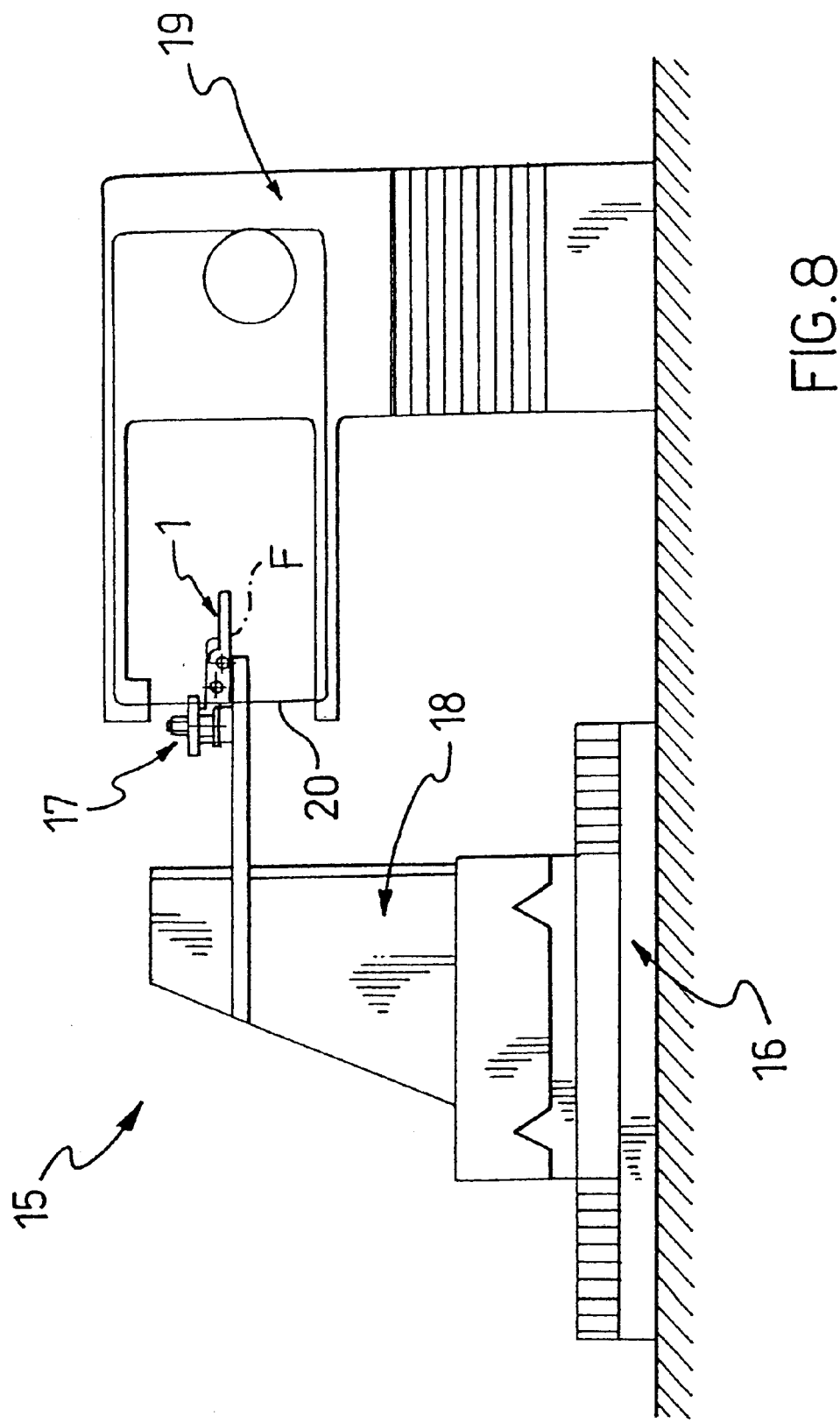
FIG. 8 is an elevational of the apparatus of FIG. 7 taken on the arrow VIII, on an enlarged scale.

With reference to the appended drawings, an openable link is generally indicated 1 and is intended to join a chain of links, indicated 2, having a plurality of chain links all indicated 3, into a closed loop to form a track for tractors and the like.

In particular, the openable link 1 compromises two connecting links 4 and 5 articulated, respectively to opposite ends 6 and 7 of the chain of links 2, by means of respective pins 8 and 9.

Naturally, the openable link 1, formed by the connecting links 4 and 5, and the links 3 are right-hand links and connecting links which, together with a left-hand openable link 1a, formed by left-hand connecting links 4a and 5a, and left-hand links 3a, which are spaced from the right-hand links, give rise to a pair of 1b of openable links, to pairs 4b and 5b of connecting links, and to pairs 3b of links.

The two connecting links 4 and 5 have respective surfaces 10 and 11 which fit one another along a predetermined profile 12 of known type which, in the embodiment shown, has the shape of a broken line defining, in the two connecting links, substantially trapezium-shaped projections and recesses forming a male and female coupling with one another to produce essentially an interlocking joint.

The two connecting links 4 and 5 are fixed together by connection means 30, for example, bolts 31 and 32 which can be removed in order to open the link 1 according to need. In this connection, the two connecting links 4 and 5 have respective seats 13 and 14 for housing the connection means 30. In the embodiment shown, these seats are formed by two through-holes 13 in the connecting link 4 and by two threaded holes 14 in the connecting link 5.

FIG. 6 shows an openable link 101 having connecting links 104 and 105 which fit along a predetermined profile 112 of known type, which has a toothed shape, enabling an interlocking joint to be formed between the connecting links. It should be noted that the method of manufacturing connection links 4 and 104 and connections links 5 and 105 is similar and thus for the purposes of illustration connection links 4 and 5 will be used to demonstrate the salient features of the present invention.

According to the present invention, a method of manufacturing the link 1 comprises the step of providing a forging F of the openable link in the form of a semi-finished element including the connecting links of the openable link as a single piece and subjecting the forging F to successive operations and, in particular, to suitable mechanical machining to produce the seats 13 and 14 as well as to a cutting operation by means of spark-erosion machining with a wire along the profile 12 to produce, from a single piece, the connecting links 4 and 5 having respective surfaces 10 and 11 which fit one another along the profile 12.

The spark-erosion machining with a wire is carried out with a wire of small diameter no greater than 0.5 mm and preferably selected between 0.2 and 3 mm.

The spark-erosion machining with a wire is advantageously carried out by means of cutting apparatus 15 which comprises, in a frame 16, a plurality of piece-holding tools 17, for example, twenty-four tools arranged at regular intervals, all carried by a single table 18, and each intended to grip one forgoing F to be cut, as well as a plurality of operating heads 19 for spark-erosion machining with wires, each carrying a wire 20. In the embodiment shown, there are eight heads 19.

The apparatus 15 is completed by a conventional device, not shown in the drawing, for operating and controlling the table 18 in order to move it relative to the heads 19 along a predetermined path P which reduces the profile 12, to bring about the desired cutting of the forgoing. In the embodiment shown, this takes place three times in succession with translation by one interval between one cut and the next.

In one embodiment of the present invention, forging F is coupled to piece holding tool 17 in a cantilevered position. To achieve a good balance on the EDM spark-erosion apparatus 15 the cantilevered position of forge L is attained by fixing forge F to piece holding tool 17 via pin hole located on connecting link 5.

The precision of the mesh/forging F position relative to the origin of the cutting program is guaranteed by a centering executed with a precise elastic bush. The elastic bush is inserted into the reamed pin hole of the forging F on connecting link 5, securing on the conic surface of a support provided on the working table. Tightening of a screw placed on the head of the conic support, the bushing is inserted into the cone. In this way, it is possible to obtain the elastic expansion of the bush whose external diameter will adhere to the reamed pin hole of connecting link 5. With forging F forced into the proper vertical position, it is locked into place. The horizontal calibration can be achieved with a calibrated pin that is inserted into the second reamed bush hole located on connecting link 4, which must enter into a corresponding reference hole or orientation face which is provided on the working table of apparatus 15. After the proper placement of connecting links 4 and 5 Forge F is locked into position.

After aligning connecting links 4 and 5, reamed bushing hole connecting link 4 is in a cantilevered position as fixed by piece-holding tool 17. Cantilevered connecting link 5 is then ready to be cut along profile 12 until it is separated from fixed pin reamed connecting link 5.

Figure 9A:
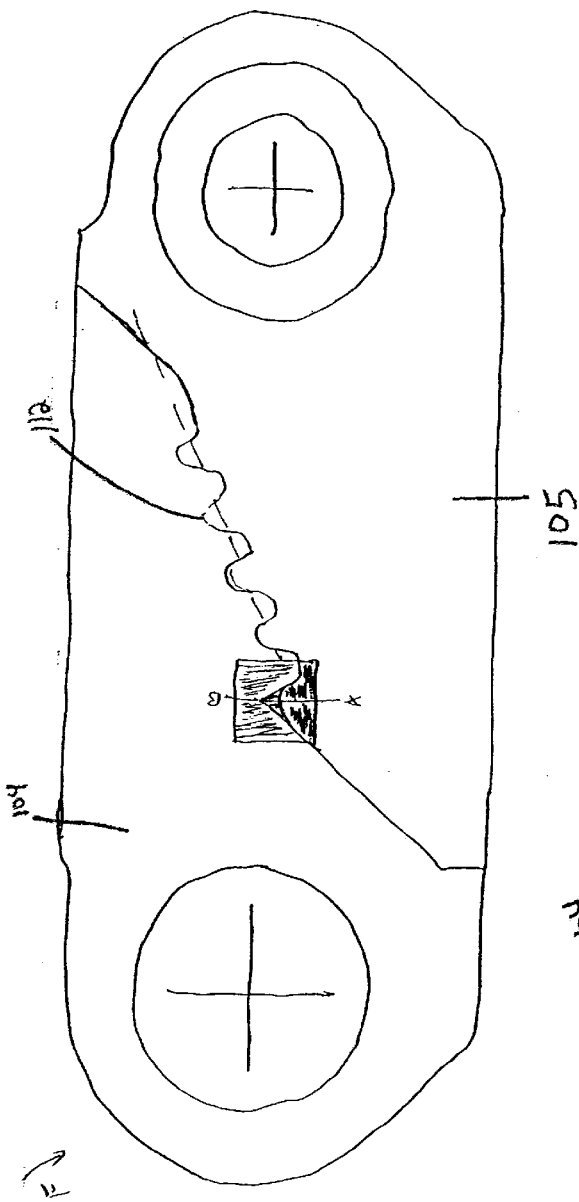
FIG. 9A is an elevational view of the opeanable link, in accordance with one embodiment of the present invention.
Figure 9B:
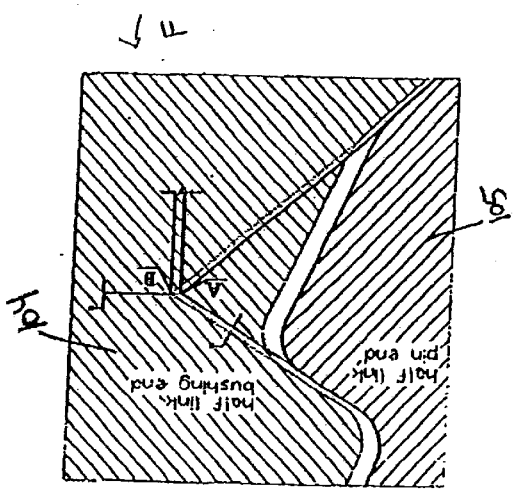
FIG. 9B shows a detail of the shaded region of FIG. 9A, in accordance with one embodiment of the present invention.

In another embodiment of the present invention, pin reamed connecting link 5, is fixed to piece holding tool 17 via its reamed pin hole. It remains fixed in apparatus 15 so that operating heads 19 may make a second pass along profile 12 so as to make the necessary undercuts and backlashes required for a proper geometric alignment between links 4 and 5. As illustrated in FIGS. 9A and 9B the cutting process used by EDM spark-erosion machines does not guarantee that one pass of cutting wire 20 will be sufficient to allow for a good connection between the separated connection links 4 and 5.

FIG. 9B, is an enlargement viewed across the cut made by wire 20 along profile 12, illustrating the gap left by wire 20 after the edge. The gap has a fixed size along the length of profile 12 which is equal to the diameter of wire 20. This gap must be retrieved during the assembly of the connecting links 4 and 5. References A and B, shown in FIG. 9A are the virtual points at which the pin bearing connection links 5 and the bushing bearing connection piece 4 will have to coincide in the work conditions.

Connection links 4 and 5 of the segments A, B move, in the connection, one opposite to the other, inducing the same movement in all points which make profile 12. Thus, every point along profile 12 will have an axial movement and a transversal movement. It is not possible to achieve this via one cut along profile 12 due to the material interferences that occur during the cut by wire 20 of heads 19. Thus, it becomes necessary to prepare connection links 4 and 5 with a movement of the centers of the pin hole in connection link 5 and the bush hole in connection link 4, compared to the final draw, a second spark-erosion cut of pin reamed connection link 5 via a second return pass by wire 20 of head 19, such that the proper undercuts and backlashes are made to link 5 ensuring a good working surface along profile 12.

As such, in one embodiment of the present invention, as illustrated in FIGS. 10A–D, it becomes necessary to remove bush reamed connection piece 4 from the work table in a manner that does not interrupt the return cut or the next cut on a multiple cut apparatus 15 such as the one pictured in FIG. 7. Under normal conditions, at the moment of separation of connection link 4 from fixed connection link 5, bushing reamed connection piece 4 tends to fall on the working table frame 16 near table 18 which needs to move about in order to operate, as described above. It therefore becomes necessary to remove connection piece 4 from the surface of the working table frame 16 and table 18 in automatic way, to avoid the remains on the table from creating obstructions to the cutting program.

Figure 10A:
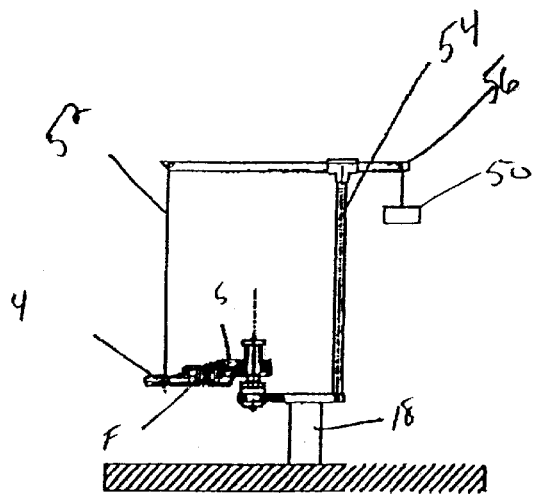
FIG. 10A is an elevational view of a work table and automatic removal device, in accordance with one embodiment of the present invention.
Figure 10B:
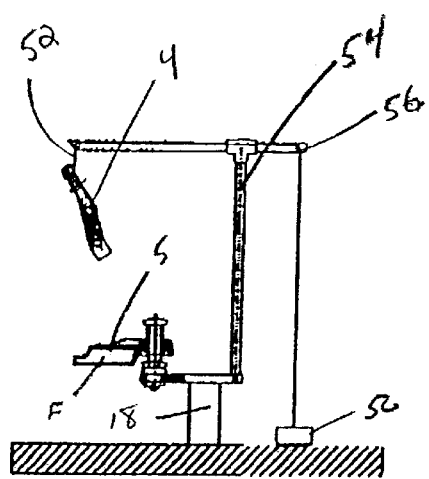
FIG. 10B is an elevational view of a work table and automatic removal device, in accordance with one embodiment of the present invention.

Thus, in one embodiment of the present invention, as illustrated in FIGS. 10A and 10B, a hanging fastener in the form of a counterpoises or counterweight 50 is connected to a flexible non-conductive wire 52. A leverage arm 54 is attached to table 18 and extends upward and over forge F. As illustrated in FIG. 10A, one end of flexible non-conductive wire 52 is attached to the bushing hole in connection link 4 where it extends upward to leverage arm 54 around a fulcrum point 56 and back down to counterweight 50 which is of a weight greater than that of connection link 4 but not so much greater that it interferes with the cutting process. Upon completion of profile cut 12, as illustrated in FIG. 10B, connection link 4 is lifted away from table 18 leaving fixed pin reamed connection link 5 in place for the second return cut bu wire spark erosion 20. The inclusion of flexible non-conductive wire 52 requires that the cut program follow a tied path so as not to cause any disruptions from the counterweight 50 or wire 52.

Figure 10C:
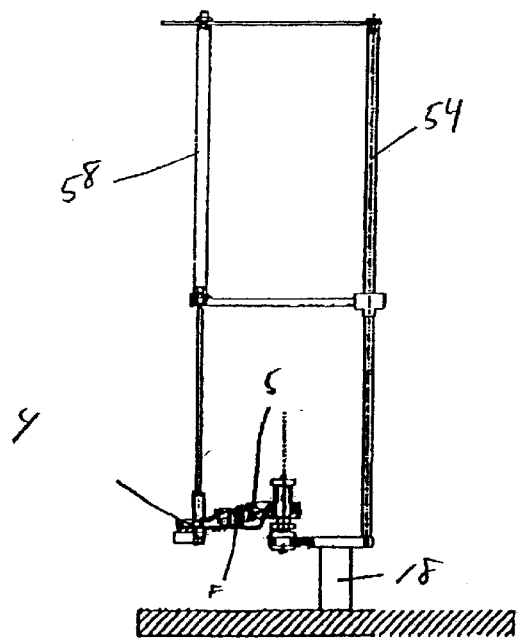
FIG. 10C is an elevational view of a work table and automatic removal device, in accordance with one embodiment of the present invention.
Figure 10D:
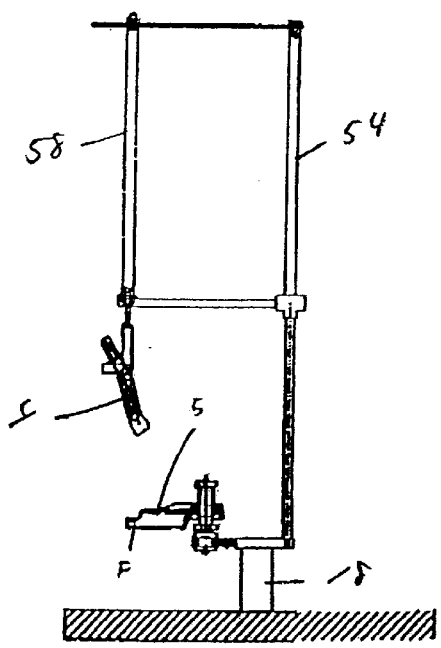
FIG. 10D is an elevational view of a work table and automatic removal device, in accordance with one embodiment of the present invention.

In another embodiment of the present invention, as illustrated in FIGS. 10C and 10D, a hanging fastener in the form of a pneumatic piston 58, controlled by sensors on mounted on table 18 is used to remove connection link 4 away from table 18 after it is cut away. As with the operation of counterpoises 50, a leverage arm 54 is attached to table 18 and extends upward and over forge F, however, in this case, a pneumatic piston 58 is attached to leverage arm 54. As illustrated in FIG. 10C, as a suitable moment appears, pneumatic piston 58 lowers itself and connects to connection link 4 through its bushing hole and locking in place. As illustrated in FIG. 10D, after the cut along profile 12 is complete, pneumatic piston 58 raises connection link 4 away from fixed link 5 allowing wire 20 and table 18 to make the return cut unimpeded. Unlike wire 52, and counterpoises 50, because cutting apparatus 15 directly control pneumatic piston 58, there is no need to run the cutting program on a tied path.

In either case, bushing reamed connection link 4 is lifted away from table 18 allowing the remaining portion of forge F, namely pin reamed connection piece 5, to remain affixed horizontally, in a cantilevered position to table 18. After the cut of profile 12, fixed pin reamed connection piece 5 remains fixed in its initial position, unmoved, and thus in best condition to be completed. At this time the cutting program instructs wire 20 to follow a return path along profile 12 in order to remove the overplus material and produce the right and necessary backlashes useful for a correct geometrical coupling of the two connection links 4 and 5.

During this return travel, the plane surfaces, such as the teeth, profile 112, and the inclined plane profile 12, are not directly touched by wire 20 because removed connection link 4 does not hamper wire 20 movement, which is free to follow a working path far from the connection link 5 surfaces that do not have to be cut again.

In practice, after the cutting cycle has been repeated three times, the apparatus 15 according to the invention produces twenty-four connecting links 1.

The main advantage of the method according to the present invention is that it enables an openable link to be manufactured with unusual precision. In fact the two connecting links which form a single forged piece instead of from two separate and different forged pieces which require the preparation of respective specific molds.

Moreover, the two connecting links are formed with unusual precision and can be juxtaposed exactly to form the openable link since the profile along which the two respective surfaces are coupled is produced by a single process. In these conditions, the actual profile along which each link is cut could even depart considerably from the theoretical profile, to the benefit of the cost of manufacture, since perfect coupling between connecting links formed from the same forgoing is in any case ensured.

A further advantage of the method according to the invention is the hard and very hard materials, for example manganese steels and the like, can be used for the openable link produced by the method according to the invention. In fact, cutting by spark-erosion machining with a wire proceeds inexorably even with the hardest materials.

A further advantage of the method according to the invention is that it achieves a saving in material both at the forgoing stage and at the machining stage. In fact the forgoing relates to a single piece and the spark-erosion machining gives rise to very little or practically no swarf in comparison with machining with tools with the removal of chips.

A further advantage of the openable link produced by the method according to the invention is that it can also be produced with very irregular coupling profiles between the connecting links without any particular increase in costs.

Yet another advantage of the multiple of attachment and cutting of forge F in apparatus 15, as illustrated in FIG. 7, is that it provides increased flexibility, as the same work area can be used to cut connection links 4 and 5 of different shapes. Another advantage of this method, in contrast to a stacking method, where connection pieces are stacked on top of one another during a cut, is that an error in the cutting process only damages one forge F as opposed to multiple forges F, thus reducing production damages cost.

Yet another advantage to this configuration is the ability to load an unload forges F during operation of apparatus 15, thus allowing for the reduction of loading and unloading dead time.

Naturally, in order to satisfy contingent and specific requirements, an expert in the art may apply to the above-described method many modifications and variations all of which, however, are included within the scope of protection of the invention as defined by the following claims.

What is claimed is:

1. A method of manufacturing a first connecting link and a second connecting link from an individual forging which can be juxtaposed along a predetermined profile to form an openable link for joining a chain of links into a closed loop to form a track, wherein the method comprises the steps of:
   providing the individual forging of said openable link;
   securing said forging in a cantilevered position on a work table; and
   cutting said forging along said predetermined profile from one side to the other side of said forging by spark-erosion machining with a wire so that said first connecting link and said second connecting link are provided with juxtaposed, side by side cut surfaces, said first connecting link is formed and separated from said second connecting link leaving said second connecting link secured on said work table in a pre-determined position.

2. The method as claimed in claim 1, further comprises after said cutting step, the additional step of providing a second return cut along the cut surface of said second connecting link.

3. The method as claimed in claim 2, further comprising after providing a second return cut, the additional step of performing on said forging at least one process to produce seats for a housing connection means for connecting said first connecting link to said second connecting link.

4. The method as claimed in claim 1, wherein a chain link forging is selected as the forging of said openable link.

5. The method as claimed in claim 1, wherein said second connecting link is fixedly secured to said work table.

6. The method as claimed in claim 5, wherein said first connecting link is hangingly fastened by a hanging fastener to said work table.

7. The method as claimed in claim 6, further comprising after said cutting step, the additional step of moving said first connecting link away from said second connecting link by said hanging fastener.

8. The method as claimed in claim 6, wherein the hanging fastener is disposed in a counterweight arrangement.

9. The method as claimed in claim 6, wherein the hanging fastener is a pneumatic piston.

10. A method of manufacturing a first connecting link and a second connecting link from an individual forging which can be juxtaposed along a predetermined profile to form an openable link for joining a chain of links into a closed loop to form a track, wherein the method comprises the steps of:

providing the individual forging of said openable link;

securing said forging in a cantilevered position on a work table, wherein said first connecting link is hangingly fastened by a hanging fastener to said work table;

cutting said forging along said predetermined profile from one side to the other side of said forging by spark-erosion machining with a wire so that said first connecting link and said second connecting link are provided with juxtaposed, side by side cut surfaces, said first connecting link is formed and separated from said second connecting link leaving said second connecting link secured on said work table in a pre-determined position; and cutting a second return cut along said cut surface of said second connecting link.

11. The method as claimed in claim 10, wherein the hanging fastener is disposed in a counterweight arrangement.

12. The method as claimed in claim 10, wherein the hanging fastener is disposed in a pneumatic piston arrangement.

13. A method of manufacturing a first connecting link and a second connecting link from an individual forging which can be juxtaposed along a predetermined profile to form an openable link for joining a chain of links into a closed loop to form a track, wherein the method comprises the steps of:

providing the individual forging of said openable link;

securing said forging in a cantilevered position on a work table, wherein said first connecting link is hangingly fastened by a hanging fastener to said work table;

cutting said forging along said predetermined profile from one side to the other side of said forging by spark-erosion machining with a wire so that said first connecting link and said second connecting link are provided with juxtaposed, side by side cut surfaces, said first connecting link is formed and separated from said second connecting link leaving said second connecting link secured on said work table in a pre-determined position;

moving said first connecting link away from said second connecting link by said hanging fastener; and cutting a second return cut along said cut surface of said second connecting link.

14. The method as claimed in claim 13, wherein the hanging fastener is disposed in a counterweight arrangement.

15. The method as claimed in claim 13, wherein the hanging fastener is disposed in a pneumatic piston arrangement.

* * * * *

UNITED STATES PATENT AND TRADEMARK OFFICE
CERTIFICATE OF CORRECTION

PATENT NO. : 6,412,267 B2
DATED : July 2, 2002
INVENTOR(S) : Duse

It is certified that error appears in the above-identified patent and that said Letters Patent is hereby corrected as shown below:

Title page,
Item [73], Assignee, should be:
-- D'ALPE S.a.s. CONSULENZE INDUSTRIALI DELL'ING. Enzo Duse & C. --

Signed and Sealed this

Twenty-seventh Day of January, 2004

JON W. DUDAS
*Acting Director of the United States Patent and Trademark Office*